United States Patent
Huang et al.

[11] Patent Number: 5,939,182
[45] Date of Patent: *Aug. 17, 1999

[54] POLYMERIC ARTICLE HAVING IMPROVED HYDROPHILICITY AND A METHOD OF MAKING THE SAME

[75] Inventors: Tzu-Li J. Huang, Woodbury; David A. Kaisaki, St. Paul, both of Minn.

[73] Assignee: Minnesota Mining and Manufacturing Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/663,965

[22] Filed: Jun. 14, 1996

Related U.S. Application Data

[62] Division of application No. 08/246,187, May 19, 1994, abandoned.

[51] Int. Cl.⁶ .................................. B32B 5/16; B05D 3/02
[52] U.S. Cl. ........................ 428/323; 427/397.7; 427/577; 427/579; 428/328; 428/329; 428/330; 428/331; 428/332; 428/336; 428/913
[58] Field of Search ........................ 428/323, 328, 428/329, 330, 331, 332, 336, 913; 427/377, 397.7, 577, 579

[56] References Cited

U.S. PATENT DOCUMENTS

| | | | |
|---|---|---|---|
| 3,895,169 | 7/1975 | Wichterle | 427/307 |
| 4,237,083 | 12/1980 | Young et al. | 264/41 |
| 4,289,798 | 9/1981 | Bugley et al. | 427/534 |
| 4,358,476 | 11/1982 | Zimmer et al. | 427/494 |
| 4,374,158 | 2/1983 | Taniguchi et al. | 427/41 |
| 4,407,695 | 10/1983 | Deckman et al. | 216/67 |
| 4,409,285 | 10/1983 | Swerdlow | 428/332 |
| 4,478,909 | 10/1984 | Taniguchi et al. | 428/331 |
| 4,536,420 | 8/1985 | Rickert, Jr. | 427/257 |
| 4,576,864 | 3/1986 | Krautter et al. | 428/328 |
| 4,613,398 | 9/1986 | Chiong et al. | 427/539 |
| 4,649,097 | 3/1987 | Tsukada et al. | 430/270 |
| 4,755,425 | 7/1988 | Huang | 428/331 |
| 4,772,488 | 9/1988 | Pinch et al. | 427/534 |
| 4,844,976 | 7/1989 | Huang | 428/323 |
| 4,885,332 | 12/1989 | Bilkadi | 524/714 |
| 4,906,379 | 3/1990 | Hodgins et al. | 210/630 |
| 5,073,404 | 12/1991 | Huang | 427/39 |
| 5,104,929 | 4/1992 | Bilkadi | 524/847 |
| 5,364,434 | 11/1994 | Sanghera et al. | 216/67 |

FOREIGN PATENT DOCUMENTS

| | | | |
|---|---|---|---|
| 0051405 A1 | 5/1982 | European Pat. Off. | C09D 3/74 |
| 0 286 225 A1 | 10/1988 | European Pat. Off. | G02B 5/13 |
| 0 378 855 A2 | 7/1990 | European Pat. Off. | C08J 1/04 |
| 58-067496 | 4/1983 | Japan | B41M 5/00 |
| H3-41402 | 2/1991 | Japan | G02B 1/10 |
| 8-131938 | 4/1996 | Japan | B05D 3/04 |
| 2249041 | 4/1992 | United Kingdom | B32B 15/02 |

OTHER PUBLICATIONS

Derwent Publications Ltd., London, GB; AN 95–027726 [04] & JP, A,6 313 062 (Daikin Kogyo KK) Nov. 8, 1994, see abstract.

Derwent Publications Ltd., London, GB; AN 80–64943C [37] & JP,A,55 099 987 (Kansai Paint KK) Jul. 31, 1980, see abstract.

G.G. Hawley, et al., *The Condensed Chemical Dictionary*, 10th edition, VanNostrand Reinhold Co., 1981 (no month) p. 822.

*Primary Examiner*—H. Thi Le
*Attorney, Agent, or Firm*—Karl G. Hanson

[57] ABSTRACT

A hydrophilic polymeric article has metal oxide particles dispersed throughout a polymeric binder material. A major surface of the polymeric material is treated so as to remove polymeric binder to provide a higher ratio of metal to carbon atoms on the major surface of the polymeric article relative to its interior. The polymeric article provides extraordinary water-spreading effects on the major surface, making the article particularly suitable for use as a surface covering on a retroreflective sheeting.

52 Claims, 3 Drawing Sheets

POLYMERIC ARTICLE HAVING IMPROVED HYDROPHILICITY AND A METHOD OF MAKING THE SAME

This is a division of application Ser. No. 08/246,187 May 19, 1994 now abandoned.

TECHNICAL FIELD

This invention pertains to (i) a hydrophilic polymeric article that contains metal oxide particles, (ii) a method of making such a polymeric article, and (iii) a retroreflective sheeting that employs the hydrophilic polymeric article as a surface covering.

BACKGROUND OF THE INVENTION

Hydrophilic polymeric articles have been used as water-spreading materials. The hydrophilic nature of the polymer causes water droplets to spread out over the surface of the polymer as a thin layer. This water-spreading property can be very important in certain instances, particularly on a traffic sign that employs a retroreflective sheeting.

Retroreflective sheetings have the ability to return a substantial portion of incident light in the direction from which the light originated. This unique ability has made retroreflective sheetings commonplace on traffic signs. At nighttime, light from motor vehicle headlights is retroreflected by the sheeting to display information on the sign to motor vehicle drivers.

Frequently, light transmission to and from a retroreflective sheeting is impaired by precipitation. A prominent form of precipitation that affects light transmission is dew formation, dew formation can be highly problematic because it occurs predominantly at nighttime when the retroreflective sheetings are operative.

When dew is present on a traffic sign in the form of small beaded water droplets, the path of incident and retroreflected light becomes significantly altered. This makes information on the sign much more difficult for passing motorists to read. In contrast, when the small water droplets spread out over the surface of the retroreflective traffic sign, the information on the sign is easier to read because the resulting thin layer of water does not disturb the path of the incident and retroreflected light to as great an extent.

To improve the performance of retroreflective traffic signs under dew conditions, investigators have developed hydrophilic surface coatings for retroreflective sheetings which allow water to spread out over the surface of the traffic sign. In U.S. Pat. Nos. 5,073,404, 4,844,976, and 4,755,425, for instance, T. Huang discloses a retroreflective sheeting that has a transparent coating comprising colloidal silica and a polymer selected from aliphatic polyurethanes, polyvinylchloride copolymers, and acrylic polymers. The colloidal silica is disposed in the polymer at about 10 to 80 weight percent (10 to 70 weight percent in the case of polyacrylates). The transparent coatings provide superior dew repellency, allowing the retroreflective sheeting to retain a higher percentage of its original brightness after being exposed to such moisture.

A number of other documents have disclosed hydrophilic materials; see, for example, U.S. Pat. Nos. 4,906,379, 4,576,864, 4,536,420, 4,478,909, and 4,409,285; U.K. Patent Application GB 2,249,041 A; and Japanese Patent Kokai H3-41402. The disclosures of each of these documents are briefly described below.

U.S. Pat. No. 4,906,379 to Hodgins et al. discloses a hydrophilic article that comprises a matrix containing molecules of a nitrile-containing polymer. Solely on the surface of the matrix, the polymer provides sufficient, uncharged, substituted amide groups to render the surface hydrophilic.

U.S. Pat. No. 4,576,864 to Krautter et al. discloses a water-spreading layer that is composed of colloid particles of metal or silicon oxide. The water-spreading layer is adhered to a plastic base by an adhesive comprising a non-water-soluble, organic solvent soluble and essentially non-swellable polar group containing polymer.

U.S. Pat. No. 4,536,420 to Rickert discloses a coating composition comprising a clear water-borne carboxylic acid functional polymer blended with an aqueous colloidal dispersion of a surface hydroxylated silica. The carboxylic acid functional polymer may be an acrylic resin. The composition produces a film when applied to a surface, and when hardened or cured, provides discrete canals in the film which tend to break up the water droplets and facilitate drainage of water from the surface.

U.S. Pat. No. 4,478,909 to Taniguchi et al. (corresponds to EP-A 0 051 405 A1) discloses an anti-fogging film comprising polyvinylalcohol, finely divided silica, an organic silicon compound and a hydrolysate thereof. The anti-fogging film is in the form of a cured film coated on a substrate, where the carbon/silicon weight ratio of the surface layer of the film is larger than that of the entire coating film and is not less than 1.7/1.0.

U.S. Pat. No. 4,409,285 to Swerdlow discloses a surface-modifying coating composition for reducing surface misting. The coating composition comprises an inorganic particulate component having an average particle size in the range of 7 to 50 nanometers, another inorganic particulate component having an average particle size in the range of 75 to 150 nanometers, polymer binder, and a volatile liquid medium. The inorganic particulate components may be colloidal silica and/or alumina particles.

U.K. Patent Application GB 2,249,041 A to the Imperial College of Science, Technology and Medicine discloses a modified hydrophobic plastic surface which has been subjected to an oxidation treatment and carries on the treated surface a layer of colloidal particles of hydrous metal oxide. The hydrous metal oxide causes the treated surface when wetted with water to demonstrate satisfactory non-fogging performance without loss of optical transmissibility.

Japanese Patent Kokai H3-41402 to Mitsubishi Rayon KK discloses a transparent, anti-dew material which is characterized in that a porous layer of silicon oxide with a thickness of 3,000 angstroms to 10 micrometers is formed on the surface of a transparent synthetic resin substrate. The silicon oxide layer has a preferred average grain diameter of below 2,000 angstroms. The porous silicon oxide layer can be formed by sputtering or ion implantation.

SUMMARY OF THE INVENTION

The present invention provides a new hydrophilic article that demonstrates extraordinary water-spreading effects. In brief summary, the article of the invention comprises a polymeric sheet having metal oxide particles dispersed in a polymeric material. The polymeric sheet has a first major surface and an interior, and on the first major surface of the polymeric sheet there is a higher ratio of metal to carbon atoms relative to the interior thereof.

The present invention also provides a new method of making an article having improved water-spreading effects. The method comprises: providing a polymeric sheet that has a first major surface and comprises metal oxide particles in a polymeric binder; and treating the first major surface of the sheet so as to remove polymeric binder therefrom to increase exposure of the metal oxide particles. The method of the invention may be utilized in providing improved water-spreading performance to the known hydrophilic compositions mentioned above which contain metal oxide particles dispersed in a polymer. Accordingly, the disclosures of the above-discussed documents disclosing such are incorporated herein by reference.

The present invention also provides a new retroreflective article, which comprises: (a) a retroreflective sheeting having first and second major surfaces; and (b) a transparent water-spreading layer disposed on the first major surface of the retroreflective sheeting. The transparent water-spreading layer has first and second major surfaces and an interior and comprises a polymeric material that has metal oxide particles dispersed therein. The first major surface of the water-spreading layer represents the exposed surface of the retroreflective article and possesses a higher ratio of metal to carbon atoms relative to the interior of the water-spreading layer. The second major surface of the water-spreading layer is juxtaposed against the first major surface of the retroreflective sheeting.

The present invention is an improvement over known hydrophilic materials. In the articles and method of the invention, a polymeric sheet is provided that has a higher ratio of metal to carbon atoms on a first major surface of the sheet relative to its interior. It has been discovered in this invention that improved water-spreading capabilities are achieved when the metal to carbon atom ratio is increased on the exposed surface of the polymeric sheet. In view of the many dangers that are present on the highway, it is very important from a safety standpoint that traffic signs are easy to read by motor vehicle drivers under all conditions, especially at nighttime when dew conditions are prevalent. The water-spreading advantage provided by applicants' discovery enables retroreflective highway signs to perform better under dew conditions, making the roads safer for motor vehicle drivers and others.

The above and other advantages of the invention are more fully shown and described in the drawings and detailed description of this invention, where like reference numerals are used to represent similar parts. It is to be understood, however, that the description and drawings are for the purposes of illustration only and should not be read in a manner that would unduly limit the scope of this invention.

DETAILED DESCRIPTION OF THE PREFERRED EMBODIMENTS

Figure 1:
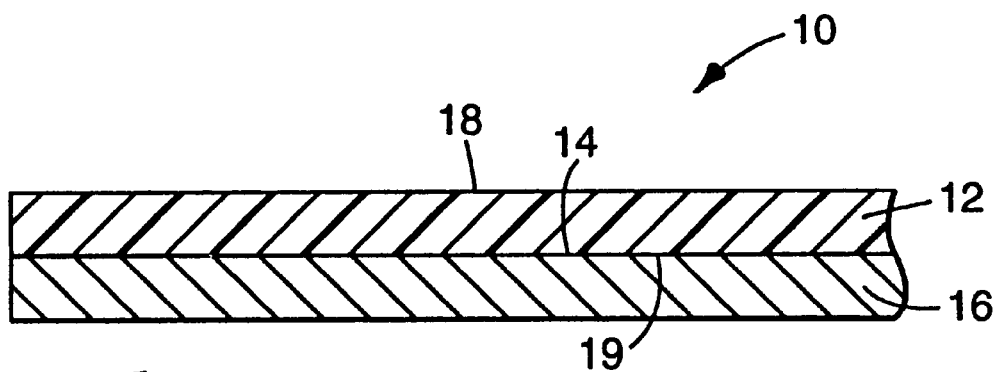
FIG. 1 is a cross-section of a retroreflective article 10 in accordance with the present invention.

In describing the preferred embodiments of the invention, specific terminology is used for the sake of clarity. The invention, however, is not intended to be limited to the specific terms so selected, and it is to be understood that each term so selected includes all the technical equivalents that operate similarly.

In the practice of the present invention, a hydrophilic polymeric article is provided that demonstrates good water-spreading capabilities making the article particularly useful as a surface covering for a retroreflective highway sign. In reference to this invention, the term "hydrophilic" means the polymeric article has an affinity for water which tends to cause the water droplets to spread out over the surface of the article. The hydrophilic polymeric article contains metal oxide particles dispersed in a polymeric binder material. The metal element of the metal oxide may be a Group 2–14 metal (using the new International Union of Pure and Applied Chemistry (IUPAC) notation issued by the Commission of Nomenclature of Inorganic Chemistry in 1988). The metal oxide particles can be, for example, an oxide of one or more of the following metals: aluminum, silicon, tin, zinc, titanium, vanadium, zirconium, and chromium. As illustrated by the previous sentence, the term "metal" is used herein to include metalloids such as silicon. It also is to be understood that the term metal oxide includes surface modified metal oxides such as silica particles treated with a silane coupling agent. Oxides of aluminum and silicon are the more preferred metal oxides, particularly silicon dioxide, $SiO_2$, and aluminum oxide, $Al_2O_3$. The metal oxide particles typically have sizes of about 0.001 to 100 micrometers, preferably 0.002 to 10 micrometers, and more preferably 0.005 to 0.08 micrometers (5 to 80 nanometers (nm)). Generally, smaller particles are preferred for purposes of obtaining better transparency in resulting article; however, large colloidal silica particles may be blended with small silica particles in the water-spreading polymeric layer to produce a transparent polymeric film. The metal oxide particles preferably are uniformly dispersed throughout the polymeric sheet at about 5 to 90 weight percent, more preferably at about 30 to 85 weight percent, and even more preferably at about 40 to 80 weight percent, based on the weight of the dried polymeric sheet.

The metal oxide particles can be obtained in the form of a colloidal dispersion, such as: a colloidal silica dispersion marketed as Nyacol™ 1440 colloidal silica, having a size of about 14 nm and a concentration of 40 weight percent silica, available from Nyacol Products, Inc., Ashland, Md.; Nalco™ 1140 silica, having a silica particle size of about 15 nm and a concentration of 40 weight percent silica in water, available from Nalco Chemical Company, Oakbrook, Ill.; Nalco™ TX2146 colloidal tin oxide dispersion; and Nalco™ 88SN-126 colloidal titanium oxide dispersion. The Nyacol™ and Nalco™ colloidal metal oxide dispersions mentioned above are suspended in an alkaline aqueous media. Other commercially available metal oxide dispersions use other solvents such as a glycol ether solvent. For example, Nalco Chemical Company sells Nalco™ 84SS-258 which has a silica particle size of about 20 nm and which can be used with polymer resins dissolved in organic solvents. Colloidal silica stabilized in an ammonium oxide aqueous media also may be used to prepare a water-spreading polymeric layer. Examples of such colloidal silica include: Nalco™ 2327 having average silica particle size of 20 nm; Nalco™ 2326 having average silica particle size of 5 nm; and Ludox™ AS having particle size of 22 nm, available from E.I. Dupont de Nemours, Wilmington, Del. Colloidal silica may be surface modified with other metal oxides such as aluminum oxide to improve the dispersion stability. An example of surface modified colloidal silica includes Ludox™ AM from E.I. Dupont de Nemours. Organic compound modified colloidal silica also may be useful for preparing a hydrophilic polymeric sheet. Acrylate, amino, hydroxy, and mercapto, and glycidoxy functional organic compound modified colloidal silica can be prepared according to the procedure described by Larry N. Lewis and Dimitris Katsamberis in *Journal of Applied Polymer Science*, v. 42, pp. 1551–1556 (1991) and in U.S. Pat. Nos. 4,885,332 and 5,104,929 issued to Z. Bilkadi. Examples of commercially organic compound modified colloidal dispersions include Highlink™ OG-4, OG-8, OG-100, and OG-512, available from Hoechst Celanese Co., Somerville, N.J. Examples of colloidal silica dispersions containing large colloidal silica particles (which may be used in conjunction with smaller silica particles) include: Nyacol™ 5050 having particle size of 50 nm, available from Nyacol Products Inc.; and Nalco™ 1060 and 2329 having particle sizes of 60 nm and 80 nm, respectively.

The metal oxide particles may be dispersed in, for example, the polymeric materials described in U.S. Pat. Nos. 5,073,404; 4,844,976; and 4,755,425. Thus, the article may contain a transparent polymer selected from the group consisting of: aliphatic polyurethanes; polyvinylchloride copolymers having a minor portion (less than 15 weight percent) of a comonomer containing at least one carboxylic acid or hydroxyl moiety; and acrylic polymers having a glass transition temperature ($T_g$) of about −20° C. to 60° C., preferably less than 45° C., wherein the silica comprises about 10 to 80 weight percent (10–70 weight percent in the case of acrylic polymers) of the transparent polymeric article. As used herein, the term "transparent" means transmitting at least 80 percent of incident light in the visible spectrum (about 400 to 700 nanometers (nm) wavelength); more preferably the sheet transmits 90% of the visible light. Transparency can be determined using an IBM model 9420 UV-visible spectrophotometer. The polymeric material generally comprises 5 to 85 weight percent of the polymeric sheet preferably 15 to 50 weight percent, and even more preferably 20 to 40 weight percent, based on the weight of the dried polymeric sheet. The mixtures used to form hydrophilic polymeric articles can be formulated by mixing various concentrations of metal oxide sol (aquasol, hydrosol or colloidal dispersion) with the polymer (for example, an aliphatic polyurethane, an acrylic polymer, or a polyvinyl chloride copolymer) in an organic solvent or in an aqueous solution.

The term aliphatic polyurethane means a polyurethane derived from at least one aliphatic polyisocyanate, preferably without any aromatic polyisocyanate. Aliphatic-polyisocyanates that may be useful in forming the aliphatic polyurethanes include: 1,4 cyclohexane bis (methyleneisocyanate); methylcyclohexylene diisocyanate; 1,4-cyclohexanyl diisocyanate; dicyclohexylmethane diisocyanate; 1,6-diisocyanato-2,2,4,4-tetramethylhexane; 1,6-hexane diisocyanate; 1,6-diisocyanato-2,4,4-trimethylhexane; and isophorone diisocyanate. The polyols used to form aliphatic polyurethanes may be polyester or polyether polyols.

When the hydrophilic polymeric article is used on a retroreflective sheeting, the raw materials selected for making the polymeric articles of the invention should not adversely affect the retroreflective performance of the underlying retroreflective sheeting. For example, the raw materials should not require drying conditions which would distort the sheeting and affect the optical relationships necessary to achieving good retroreflectivity. The raw materials desirably do not contain solvents or other ingredients which would dissolve or corrode underlying retroreflective sheeting components. Coating mixtures containing toluene, isopropanol and butyl cellosolve have been found to be suitable for use in applying the hydrophilic polymeric article to a retroreflective sheeting.

The polymer mixed with the metal oxide sol preferably is somewhat elastic, especially in cases where the retroreflective sheeting is to be applied to a flexible substrate. Several of the polymers which have been found to be useful are set forth below (all monomer percents being expressed in weight percent):

Aliphatic Polyurethanes:

NeoRez∩ R-960 and R-963 Polyurethanes, flexible polyurethanes sold in an approximately 30–35 percent by weight concentration in water by Zeneca Resins, Wilmington, Massachusetts. This polyurethane is believed to be derived from dicyclohexylmethane diisocyanate, and its molecular weight is believed to be at least 200,000 grams per mole. Other aliphatic polyurethane dispersions include Sancure™ 774, 847, 899, and A-1364, available from Sancor Chemical Co., Leominster, Mass.

Permuthane U-6729 urethane resin sold in a 1:1 mixture of isopropanol and toluene at a concentration of 25% resin by Permuthane Coatings, Peabody, Mass. This resin is believed to be derived from the following monomers: dicyclohexylmethane diisocyanate; adipic acid; neopentyl glycol; and 1,6-hexanediol. It is believed to have a weight average molecular weight (Mw) of about 33,000 grams per mole and a number average molecular weight (Mn) of about 11,000 grams per mole. Permuthane U-23-327 urethane resin sold in a 1:1 mixture of isopropanol and toluene or methyl cellosolve at a concentration of about 35% resin.

Polyvinyl chloride copolymers:

VROH copolymer, believed to have the following monomer content: vinyl chloride (79–83%), vinyl acetate (5%), and vinyl alcohol ($\leq 15\%$). It is believed to have 1.8 to 2.2 weight percent hydroxyl content.

VMCH copolymer believed to have the following monomer content: vinyl chloride (85–88%), maleic acid (0.8–1.2%) and vinyl acetate (about 13%). In lieu of maleic acid, acrylic and methacrylic acids may be incorporated into the useful polyvinyl chloride copolymers.

VAGH partially hydrolyzed copolymer believed to have the following monomer content: vinyl chloride (89.5–91.5%), vinyl acetate (3%) and vinyl alcohol (5.2–6.5%). VROH, VMCH and VAGH copolymers are available from Union Carbide Corporation. When using the polyvinyl chloride transparent polymers, they are normally furnished dissolved in an organic solvent (for example, 10 weight percent in methyl ethyl ketone). In this case, silica may be furnished in an organic medium, for example, a Nalco™ 84SS-258 colloidal $SiO_2$ dispersion in glycol ether.

Acrylic Polymers:

NeoCryl™ A601 polymer, NeoCryl™ A612 polymer, and NeoCryl™ A614 polymer, all available from Zeneca Resins in water emulsion form. These polymers are believed to be copolymers of methyl methacrylate and butyl methacrylate having a weight ratio of methyl methacrylate units to butyl methacrylate units in the polymer in the range of 0.25–0.6. The ratio for the three named polymers are believed to be as shown below:

| | Weight Ratio of Monomeric Units in Polymer Methylmethacrylate/Butyl Methacrylate |
|---|---|
| NeoCryl ™ A601 | 0.33 |
| NeoCryl ™ A612 | 0.43 |
| NeoCryl ™ A614 | 0.47 |

The molecular weights of the polymers typically is: Mw in the range of 300,000–350,000 grams per mole and Mn in the range of 50,000–70,000 grams per mole. The following molecular weights have been determined through analyses of two of the NeoCryl™ polymers.

| | Mw | Mn |
|---|---|---|
| NeoCryl ™ A612 | 323,000 | 60,000 |
| NeoCryl ™ A614 | 304,000 | 54,000 |

These emulsions are believed to have a pH similar to that of the silica sols with which they are used. These emulsions are believed to be characterized by: 32 weight percent solids, pH of 7.7–8.0, viscosity at 25° C. of 100–200 centipoise, and specific gravity of 1.0. They are also believed to contain anionic surfactants and some organic solvents (11–14 weight percent) said by the manufacturer to be coalescing solvents, as follows:

| | A601 | A612 | A614 |
|---|---|---|---|
| aromatic napthta | 4.8% | 4.3% | 3.7% |
| 2-butoxyethanol | — | 1.3% | 1.1% |
| 2-(2-ethoxyethoxy)ethanol | — | 2.2% | 1.9% |
| 2-methoxypropanol | — | 5.0% | 4.3% |
| ethylene glycol | — | 1.0% | 0.8% |
| diacetone alcohol | 7.9% | — | — |

Coalescing solvents have an affinity for the polymer and water and a higher boiling point than water, at atmospheric pressure.

The NeoCryl™ acrylic polymers can be blended with the NeoRez™ polyurethanes to form a clear coating with colloidal silica. Such blends (for example, a 2:1 weight ratio of acrylate to polyurethane) have been found to have excellent transparency, flexibility, and adhesion.

Copolymers of acrylic and aliphatic polyurethanes also may be used to form a hydrophilic polymeric article. Examples of the copolymers may be NeoPac™ R-9000, R-7061, and R-9030 available from Zeneca Resins. Polyethylene copolymers also can be used; examples include: poly(ethylene-co-(meth)acrylic acid), such as Adcote™ 7R4, 50C12, and 50C35, available from Morton International Inc., Chicago, Ill.; poly(ethylene-co-acrylic acid); poly(ethylene-co-vinylacetate); ionomeric ethylene copolymers such as Surlyn™ 1705, 8940, and 9970 available from E.I. Dupont de NeMours.

When the waterborne resins are used such as NeoRez™ resins or Sancure™ resins of aliphatic polyurethane, NeoCryl™ resins of polyacrylate, NeoPac™ resins of copolymer of acrylate and aliphatic urethane, Adcote™ resins of poly(ethylene-co-(meth)acrylic acid), it has been found useful to include a multifunctional aziridine crosslinking compound such as CX-100 cross-linker (from Zeneca Resins), a multifunctional carbodiimide compound such as cross-linker XL-29SE (from Union Carbide Co., Danbury, Conn.), a melamine curing agent, or epoxy curing agent, to improve the physical properties of the final coating.

A reactive resin system also can be used with organic-functional-group-modified colloidal silica to form a hydrophilic polymeric layer. The polymeric precursors can be polymerized by exposure to actinic radiation, for example, electron beam, ultraviolet light, or visible light. Additionally, these materials may be polymerized by thermal means with the addition of a thermal initiator such as benzoyl peroxide. Radiation initiated cationically polymerizable resins also may be used. Reactive resins suitable for forming the water-spreading polymeric layer may be blends of at least one compound bearing an acrylate group, a metal oxide, and a photoinitiator. Preferably, the resin blend contains difunctional or polyfunctional compound to ensure the formation of a crosslinked polymeric network upon irradiation.

Examples of resins that are capable of being polymerized by a free radical mechanism include acrylic based resins derived from epoxies, polyesters, polyethers and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof. The term acrylate is used in here to encompass both acrylates and methacrylates.

Ethylenically unsaturated resins include both monomeric and polymeric compounds that contain atoms of carbon, hydrogen and oxygen, and optionally nitrogen, sulfur and the halogens. Oxygen or nitrogen atoms or both are generally present in ether, ester, urethane, amide and urea groups. Ethylenically unsaturated compounds preferably have a molecular weight of less than about 4,000 and preferably are esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Examples of compounds having an acrylic or methacrylic groups are listed below.

(1) Monofunctional compounds:
ethylacrylate, n-butylacrylate, isobutylacrylate, 2-ethylhexylacrylate, n-hexylacrylate, n-octylacrylate, isobornyl acrylate, tetrahydrofurfuryl acrylate, 2-phenoxyethyl acrylate, N,N-dimethylacrylamide;

(2) Difunctional compounds:
1,4-butanediol diacrylate, 1,6-hexanediol diacrylate, neopentylglycol diacrylate, ethylene glycol diacrylate, triethyleneglycol diacrylate, tetraethylene glycol diacrylate;

(3) Polyfunctional compounds:
trimethylolpropane triacrylate, glyceroltriacrylate, pentaerythritol triacrylate, pentaerythritol tetraacrylate, and tris(2-acryloyloxyethyl)isocyanurate.

Some representative examples of other ethylenically unsaturated compounds and resins include styrene, divinylbenzene, vinyl toluene, N-vinyl pyrrolidone, N-vinyl caprolactam, monoallyl, polyallyl, and polymethallyl esters such as diallyl phthalate, diallyl adipate, and amides of carboxylic acids N,N-diallyladipamide.

Examples of photopolymerization initiators which can be blended with the acrylic compounds include the following illustrative initiators: benzil, methyl o-benzoate, benzoin, benzoin ethyl ether, benzoin isopropyl ether, benzoin isobutyl ether, et cetera, benzophenone/tertiary amine, acetophenones such as 2,2-diethoxyacetophenone, benzil methyl ketal, 1-hydroxycyclohexyl phenyl ketone, 2-hydroxy-2-methyl-1-phenylpropan-1-one, 1-(4-isopropylphenyl)-2- hydroxy-2-methylpropan-1-one, et cetera. These compounds may be used individually or in combination.

Cationically polymerizable materials include but are not limited to materials containing epoxy and vinyl ethers functional groups. These systems can be photoinitiated by onium salt initiators such as triarylsulfonium, and diaryliodonium salts.

Other compounds that may be incorporated into the polymeric composition of this invention include surfactants, ultraviolet (UV) light stabilizers, UV absorbers, curing agents, coupling agents, et cetera. The surfactant may be a polyalkylene oxide modified polydimethylsiloxane sold under the trademark SILWET by Union Carbide Corporation. UV light stabilizers or absorbers may be employed to improve the stability and weatherability of the protective coating. One suitable UV light absorber is Uvinul™ N-539 from GAF, New York, N.Y. Uvinul™ N-539 (2-ethylhexyl-2-cyano-3,3-diphenyl acrylate) has been used as a UV absorber in aliphatic polyurethane polymers. Tinuvin™ 292, 328, and 1130, (from Ciba-Geigy Corporation of Ardsley, N.Y.) also may be used as general purpose UV absorbers. Coupling agents such as silanes, acrylato chromic compounds, and organic titanates may be incorporated into the polymeric composition to produce a strong chemical bond between the metal oxide particles and the polymeric binder. Examples of silane compounds include aminofunctional silanes such as gamma-aminopropyltriethoxysilane and N-beta-aminoethyl-gama-aminopropyltrimethoxysilane; mercapto-functional silanes such as gamma-mercaptopropyl-trimethoxysilane; glycidoxy-functional silanes such as gamma-glycidoxypropyltrimethoxysilane, and beta-3,4-epoxycyclohexyl-ethyltrimethoxysilane; and Ucarsil™ AF-1 (from Union Carbide Corp., Danbury, Conn.). An example of an acrylato chromic compound is Volan™ (from Zaclon-Dupont, Cleveland, Ohio). Examples of organic titanates are Tyzor™ AA, LA, and TE, (available from E.I. Dupont de Nemours). The concentration ranges for the minor ingredients in the composition that forms the polymeric sheet may be: 0 to 3 weight percent for the surfactant; 1 to 6 weight percent for the UV stabilizer; 1 to 6 weight percent for the UV absorber; 1 to 4 weight percent for the curing agent; and 2 to 6 weight percent for the coupling agent.

The polymeric article of the invention may be used in sheet form as a surface coating disposed on the first or front surface of a retroreflective sheeting to provide a hydrophilic retroreflective article that demonstrates good water spreading capabilities. The polymeric sheet or layer in general is a film having a thickness of about 0.1 to 100 micrometers, preferably 0.2 to 15 micrometers, and more preferably 0.3 to 5 micrometers. A variety of retroreflective sheetings have been disclosed in the art, and this invention may be useful as a surface covering on essentially any retroreflective sheeting.

A retroreflective sheeting typically comprises a reflective material and optical elements. The reflective material serves to reflect incident light, and the optical elements serve to redirect the incident light towards the light source. The reflective material often comprises a specular metal reflector such as an aluminum or silver-containing layer (see, for example, U.S. Pat. No. 5,283,101) or a dielectric reflector (see, for example, U.S. Pat. Nos. 3,700,305 and 4,763,985) but also may comprise a diffuse reflector such as a heavy metal pigment(s). The optical elements typically come in one of two forms: beaded lens elements and cube corner elements. Examples of retroreflective sheeting that employ beaded lens elements have been disclosed in U.S. Pat. Nos. 2,407,680, 3,190,178, 4,025,159, 4,896,943, 5,064,272, and 5,066,099. Examples of retroreflective sheeting that employ cube corner elements have been disclosed in U.S. Pat. Nos. 3,684,348, 4,801,193, 4,895,428, 4,938,563, and 5,272,562. The disclosures of the patents cited in this paragraph are incorporated here by reference.

As shown in FIG. 1, a water-spreading polymeric layer 12 of the invention may be juxtaposed on the first or front major surface 14 of a retroreflective sheeting 16. The first or front surface is the surface of the retroreflective sheeting through which incident light passes so as to be retroreflected by the sheeting. When juxtaposed in such a position, incident light must pass through the polymeric layer 12 in order to pass through the optical elements (not shown) and be reflected by the reflective material (not shown) in the retroreflective sheet 16. Typical front surfaces for retroreflective sheetings are comprised of polyacrylate (for example, polymethylmethacrylate), copolymers of ethylene and acrylic acid units (see, for example, U.S. Pat. No. 5,064,272), polyurethane (typically aliphatic polyurethane), polyvinylchloride, or polycarbonate. The polymeric layer 12 may be secured to the front surface 14 by use of an adhesive (not shown). In a distinctly different embodiment, however, the front surface can be primed to make it receptive to the polymeric layer. The priming step may include corona treating the front surface 14 of the retroreflective article, and this can permit the polymeric layer 12 to be secured thereto without an adhesive.

A retroreflective sheeting of this invention may be prepared by the following steps:

A) Preparing a dispersion by mixing colloidal metal oxide with a selected polymer, such as a polyurethane, and any other desired ingredients, such as light stabilizer or cross-linking agent;

B) Providing a retroreflective sheeting and priming the front surface of the sheeting by a corona treatment or other suitable means;

C) Coating the dispersion onto the front surface of the retroreflective sheeting as a layer by any suitable means, such as a wire wound bar coating, knife coating, roll coating, or dip coating;

D) Drying the wet coating from step C and curing it by placing the retroreflective film in an oven or other suitable curing apparatus; and E) Treating the cured polymeric layer to remove polymeric binder from the exposed surface of the coating to increase the exposure of the metal oxide particles.

In some embodiments, the water-spreading polymeric layer may be 10 bonded directly to a retroreflective sheeting, for example, when the front surface possesses a polyurethane composition; however, for a retroreflective sheeting with a polyacrylate front surface, it has been found desirable to pretreat the front surface of the sheeting with a corona treatment to achieve a good bond between the sheeting and the water-spreading polymeric layer. A general discussion of corona treatment of webs may be found in R. H. Cramm and D. V. Bibee, *The Theory and Practice of Corona Treatment for Improving Adhesion,* TAPPI, pp. 75–78 (August 1982). The apparatus used in such corona treatment has been a Softal-Electric Company machine from West Germany, Model 3025DW, having 1.2 kilowatt (Kw) maximum power and electrode 0.56 meters (m) long. The front surface of the retroreflective sheeting has been treated using a current of 180 to 300 milliamps and drawing the sheeting through the apparatus at a rate of 10 to 100 meters per minute for a sheet about 0.3 meters wide. A typical treatment level is about 0.3 to 1.5 joules per square centimeter ($j/cm^2$).

The conditions for step D are generally about 50 to 100° C. for 1 to 10 minutes in an air atmosphere. Generally, a retroreflective sheeting having a polyurethane front surface can withstand somewhat higher temperatures, and a curing condition of 93° C. for 2 to 3 minutes is appropriate. In the case of polyacrylate front surfaces, however, conditions are preferably about 65° to 75° C. for 3 to 10 minutes.

Sometime before or after securing the water-spreading polymeric layer to the front surface of the retroreflective sheeting, the former is treated to remove polymeric binder from the first or exposed major surface 18 of polymeric layer 12. The "exposed major surface" is the major surface of the polymeric layer 12 which is not juxtaposed against the first or front surface 14 of the retroreflective sheeting 16. The language "juxtaposed against" is not to be interpreted in a manner that means the second or non-exposed surface 19 of the polymeric layer 12 must be in contact with the retroreflective sheeting 16. There may be other layers, for example, prime layers, adhesive layers, clear top films, et cetera, between the two surfaces. Thus, the language merely means the front surface 14 of the retroreflective sheeting 16 faces the non-exposed major surface 19 of the water-spreading polymeric film 12 in some kind of secured arrangement. The water-spreading polymeric layer may be first applied to a top film, treated to remove polymeric binder, and then secured to the retroreflective sheeting on the top film. In this situation, it is considered that the water-spreading layer is disposed on and juxtaposed against the retroreflective sheeting.

There are a variety of ways of treating the exposed major surface of the water-spreading polymeric layer in accordance with the present invention. The exposed major surface may be corona treated, oxygen plasma treated, chemically treated such as with a solution or chemical etchant, ozone treated, or an excimer laser treated. Regardless of the particular method chosen, what is important is that the polymeric binder be removed from the exposed major surface to increase exposure of the metal oxide particles so that there is a higher ratio of metal to carbon atoms on the exposed major surface relative to the interior thereof. As the term is used herein, "interior" means that portion of the polymeric layer that is more than 50 nanometers below the top of the first or exposed major surface of the water-spreading polymeric layer. Preferably, the exposed major surface has a metal to carbon atom ratio of at least 0.01, more preferably 0.3 to 3, and even more preferably of 0.4 to 1.5. The exposed major surface of the polymeric article generally has at least about a 20 percent higher ratio of metal to carbon atoms relative to the interior, preferably at least about a 30 percent higher ratio, More preferably, the exposed major surface has a metal to carbon ratio that is at least 45 percent higher than that of the interior. In some embodiments, the metal to carbon atom ratio may be 100 percent higher than the interior and may be as much as 400 percent higher.

When air corona treatment is used to remove polymeric binder from the exposed surface, the energy level generally is at least 1 $j/cm^2$, and typically is about 2 to 20 $j/cm^2$. If the exposed major surface is subject to a single air corona treatment, the energy level preferably is about 7 to 12 $j/cm^2$; whereas if the exposed major surface is multiply treated, the energy level is about 3 to 5 $j/cm^2$ for each pass. Overall, it is preferred that the exposed major surface be subject to a total approximately 5 to 15 $j/cm^2$ of energy, preferably by two consecutive air corona treatments.

Although the hydrophilic polymeric article of the invention has been illustrated as a surface covering for a retroreflective sheeting, there are a variety of other surfaces onto which the article of the invention may be used. For example, the hydrophilic polymeric article may be disposed on a glass or plastic window (for example, in a greenhouse), a mirror, eyeglass lenses, goggles, et cetera.

Figure 2:
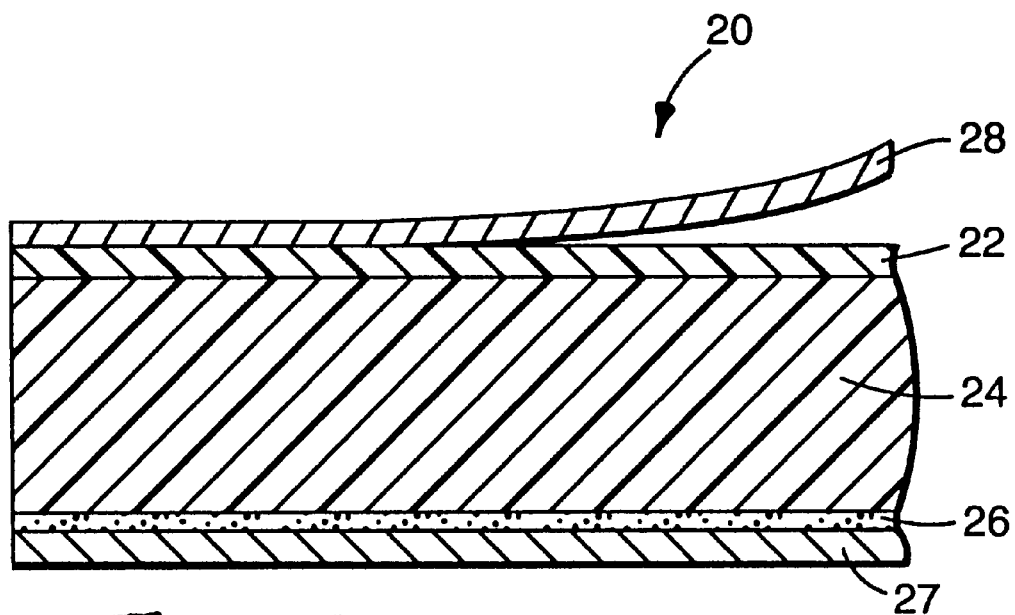
FIG. 2 is a cross-section of a hydrophilic polymeric article 20 in accordance with the present invention.

In FIG. 2 there is shown an article 20 that can be applied to any of the substrates mentioned above. Article 20 includes a polymeric water-spreading layer 22, a transparent plastic layer 24, an adhesive 26, a release liner 27, and a protective sheet 28. The water-spreading layer 22 may be the hydrophilic polymeric article of the invention described above. The transparent plastic layer 24 can be, for example, a layer of an acrylic polymer having a thickness of about 10 to 250 micrometers. The acrylic layer may be biaxially oriented and may contain UV light absorbers and stabilizers. The adhesive 26 is disposed on the backside of the transparent plastic layer 24. The adhesive 26 preferably is a pressure-sensitive adhesive and may comprise acrylic copolymers. The adhesive layer 26 preferably is transparent to visible light and has a thickness of about 10 to 150 micrometers. A release liner 27 may be disposed on the back surface of the adhesive layer to protect the same until article 20 is intended to be adhered to a substrate (not shown). Sheet 28 can be disposed over the front surface of the polymeric water-spreading layer 22 to protect that layer until article 20 is placed in use.

The invention is further illustrated by the following Examples, which are intended to be purely exemplary. It is to be understood, however, that while the Examples serve this purpose, the particular ingredients and amounts used as well as other conditions and details are not to be construed in a manner that would unduly limit the scope of this invention. In the Examples, percentages of the protective coating constituents in the water-spreading layer are expressed as weight percent, taking the total of the metal oxide particles and polymer and additives as 100 weight percent.

EXAMPLES

Example 1

This Example describes preparing an aqueous coating dispersion containing metal oxide particles, coating the dispersion on a plastic substrate, and treating the dried coating to remove polymeric binder from the exposed surface.

To a stirring solution containing 102.78 grams of NeoRez™ R-960 and 384 grams of water was added 17.66 grams of a UV light stabilizer, Tinuvin™ 292. After further stirring, 1170.82 grams of an acrylic waterborne polymer resin NeoCryl™ A-614 was added to the mixture. Tinuvin™ 1130 (27.32 grams), another UV light stabilizer, was added to the stirring mixture. To the NeoRez™/NeoCryl™ mixture was added 1056 grams of Nalco™ 1140 colloidal silica dispersion. When the addition of the colloidal silica was completed, 835.58 grams of water was added to the stirring mixture. CX-100 (25.60 grams), a polyfunctional aziridine crosslinker, was then added to the milky mixture. The mixture was stirred for about 5 minutes. The content of the dispersion is summarized below in Table 1.

The dispersion was coated on a surface of a Scotchlite™ Electronic Cuttable Film Series 1170 (EC-Film) available from 3M, St. Paul, Minn. The EC-Film was a polymethylmethacrylate-based film which had a clear pressure sensitive adhesive and paper liner backing on one side. Prior to the coating of the dispersion, the EC-Film was pre-treated with an air corona at a power of about 1.25 joule/cm². The dispersion was coated on the EC-Film by means of a Gravure coater with a 100 line stylus having cell volume of 14.2 billion cubic micrometers per square inch. The coated EC-Film was dried and cured by passing the film through a series of forced air ovens with temperature control in oven 1 at 43° C. and in ovens 2 to 5 at 88° C. Total length of the series of ovens was 135 feet, and the web speed was controlled at 50 feet per minute.

Dried samples of the coating on EC-Film were then treated on their exposed major surface with a high energy air corona discharge at power levels of 0, 2.8, 8.3, 11.1 joules/cm² using a Sherman corona treating unit (Sherman Treaters, Ltd., United Kingdom) in the bare ground role configuration. The identifying sample numbers for each air corona treated sample in this Example are listed in Table 3 as Samples 1A through 1D.

A sample of the coating on EC-Film also was treated with an oxygen plasma. The plasma instrument was configured with parallel plate electrodes at a gap of 3 centimeters with a plate dimension of 22.9 by 33 centimeters. The oxygen pressure was set to 200 millitorr at a net power of 300 watts. The time of exposure of the coating to the plasma was 1

| Example | Air Corona Power Level joule/cm²) | Gravure Coater Line Number | Web Speed (feet/minute) |
|---|---|---|---|
| 3 | 1.5 | 100 | 40 |
| 4 | 1.14 | 79 | 20 |
| 5 | 1.14 | 120 | 20 |

To dry and cure the coatings, the coated EC-Films were passed through a series of forced air ovens that were temperature controlled. In Example 3, coated EC-Film was dried and cured with oven 1 at room temperature and ovens 1 to 5 at 88° C. Total length of the series of ovens was 135 feet. The coated EC-Films of Examples 4 and 5 were dried and cured in another series cure ovens with oven 1 at room temperature and ovens 2 to 4 at 88° C. Total length of this series of ovens was 72 feet. Samples of the coated EC-Film Examples 3–5 were treated on their exposed major surface with high power air corona discharge post-treatment at power levels of 0, 2.8, 8.3, and 11.1 joule/cm². The identifying sample numbers for these Examples are listed in Table 3 as Samples 3A through 5D.

TABLE 1

| Example | Neorez ™ R-960 (grams) | Neorez ™ R-963 (grams) | Neocryl ™ A-614 (grams) | Nalco ™ 1140 (grams) | Nalco ™ 2327 (grams) | Tinuvin ™ 292 (grams) | Tinuvin ™ 1130 (grams) | CX-100 ™ (grams) | Water (grams) |
|---|---|---|---|---|---|---|---|---|---|
| 1 | 102.8 | — | 1170.8 | 1056.0 | — | 17.7 | 27.3 | 25.6 | 1219.6 |
| 2 | 22.0 | — | 234.4 | 130.0 | — | 3.6 | 5.6 | 5.1 | 196.0 |
| 3 | 637.5 | — | 1912.6 | 3825.0 | — | 106.0 | 106.0 | 51.0 | 3659.0 |
| 4 | — | 150.0 | 478.2 | — | 956.3 | 26.5 | 26.5 | 12.8 | 914.8 |
| 5 | — | 102.1 | 325.3 | 1142.5 | — | 26.5 | 26.5 | 12.8 | 2255.9 | minute. The identifying number for this sample is listed in Table 3 as Sample 1E.

Examples 2

In this Example, the coating dispersion was prepared similar to the procedure of Example 1, except a different coating apparatus was used and the amount of the components in the coating dispersion were as shown in Table 1. The dispersion was coated on an EC-Film that had been previously treated with an air corona at an energy level of about 1 joule/cm². The dispersion was coated on the EC-Film by means of a wire wound coating bar (wire 0.914 mm diameter). The coated EC-Film was dried in a forced air oven at 82° C. for about 10 minutes. Samples of the coating on the EC-Film were treated on their exposed major surface with high power air corona discharge post-treatment at power levels of 0, 2.8, 8.3, and 11.1 joule/cm². The identifying sample numbers for this Example are listed in Table 3 as Samples 2A through 2D.

Examples 3–5

These Examples also illustrate how to prepare products similar to but different from those of Example 1. Examples 3–5 were prepared according to the procedure of Example 1, except there were variations in the coating conditions, and the content and amount of the components in the coating dispersion were modified as shown in Table 1. The dispersions were coated on an EC-Film that had been previously treated with an air corona. Variations of the coating conditions of Example 3–5 are listed below.

Example 6

An aqueous coating dispersion containing colloidal tin oxide was made using the following method: to a stirring solution of 5.9 grams of NeoRez™ R-960 was added 1.0 grams of Tinuvin™ 292 and 20 grams of water. To this mixture was added 64.8 grams of NeoCryl™ A-614 followed by 1.5 grams of Tinuvin™ 1130. To the stirring mixture was then added 109.3 grams of Nalco™ TX2146 colloidal tin oxide. The dispersion was diluted with 46.1 grams of water, and 1.4 grams of CX-100 was added to the stirring mixture. The composition of the formulation is summarized below in Table 2. The coating dispersion was coated to an EC-Film in a manner similar to Example 2. The coated EC-Film was treated with an air corona discharge at 11.1 joule/cm² using a Sherman corona discharge treating unit as described in Example 1. The sample numbers for this Example are identified below in Table 3 as Samples 6A and 6B.

Example 7

A coating dispersion using a titanium oxide colloidal dispersion was prepared according to Example 6, except the content and amount of the components were modified as shown below in Table 2. The coating dispersion was applied to an EC-Film in a manner similar to Example 6. The coating on the EC-Film was treated with an air corona discharge at a power of 11.1 joule/cm² using a Sherman corona discharge treating unit as described in Example 6. The sample numbers for this Example are identified below in Table 3 as Samples 7A and 7B.

TABLE 2

| Example | Colloidal Metal Type | Neorez R-960 (grams) | Tinuvin 292 (grams) | Neocryl A-614 (grams) | Tinuvin 1130 (grams) | Nalco TX2146 (grams) | Nalco 88SN-126 (grams) | CX-100 (grams) | Water (grams) |
|---|---|---|---|---|---|---|---|---|---|
| 6 | Sn | 5.9 | 1.0 | 64.8 | 1.5 | 109.3 | — | 1.4 | 66.1 |
| 7 | Ti | 3.95 | — | 19.4 | — | — | 62.0 | 0.42 | 14.2 |

TABLE 3

Post-Treatment Conditions and Samples

| Example | Metal Oxide Content (% by weight) | Air Corona Power Level (joule/cm²) Untreated | Oxygen 2.8 | 8.3 | 11.1 | Plasma |
|---|---|---|---|---|---|---|
| 1 | 46.8 | 1A | 1B | 1C | 1D | 1E |
| 2 | 35.1 | 2A | 2B | 2C | 2D | |
| 3 | 58.6 | 3A | 3B | 3C | 3D | |
| 4 | 58.6 | 4A | 4B | 4C | 4D | |
| 5 | 69.1 | 5A | 5B | 5C | 5D | |
| 6 | 47.0 | 6A | | | 6B | |
| 7 | 47.0 | 7A | | | 7B | |

Test Methods and Analysis

The following tests and analyses were used to evaluate the metal oxide containing polymeric sheets.

Surface Element Composition

The atomic concentration at the surface of the colloidal metal oxide coatings was evaluated using X-ray photoelectron spectroscopy (XPS) before and after post-treatment with air corona discharge or oxygen plasma. A Hewlett-Packard 5950B X-ray photoelectron spectrometer set at a take-off angle of 38° was used to analyze the test surface. This technique measures the surface concentration of the atomic elements present at approximately the top 2 to 3 nanometers of the coating. Preferably, upon use of the appropriate post treatment as described in these Examples, the surface metal content will increase while the carbon content will decrease. This would be the result of a larger amount of the colloidal metal oxide particles and a smaller amount of the polymer resin binder (NeoCryl™ and Neo-Rez™ binders) exposed at the surface of the coating after the post-treatment. Table 4A lists the carbon, oxygen, and silicon content by the atomic composition percent of each element present and the metal atom to carbon atom ratios of Examples 1–5. Each sample corresponds to the different post-treatment conditions as listed in Table 3. Other minor elements may be present at the surface that are not listed in this Table.

TABLE 4A

XPS Atomic Concentration Analysis of Colloidal Silica Coatings at Different Air Corona Post-Treatment Levels

| Sample | Carbon (%) | Oxygen (%) | Silicon (%) | Si/C ratio |
|---|---|---|---|---|
| 1A[a] | 57 | 33 | 9.0 | 0.16 |
| 1B | 45.7 | 40.0 | 12.3 | 0.27 |
| 1C | 37.1 | 44.6 | 16.0 | 0.43 |
| 1D | 36.8 | 44.1 | 16.1 | 0.44 |
| 1E | 26 | 43 | 17 | 0.65 |
| 2A[a] | 68 | 26 | 4.0 | 0.06 |

TABLE 4A-continued

XPS Atomic Concentration Analysis of Colloidal Silica Coatings at Different Air Corona Post-Treatment Levels

| Sample | Carbon (%) | Oxygen (%) | Silicon (%) | Si/C ratio |
|---|---|---|---|---|
| 2B | 61 | 32 | 5.0 | 0.08 |
| 2C | 55 | 35 | 8.0 | 0.15 |
| 2D | 53 | 37 | 9.0 | 0.17 |
| 3A[a] | 42.0 | 42.3 | 12.7 | 0.30 |
| 3B | 31.1 | 47.6 | 18.6 | 0.60 |
| 3C | 25.8 | 51.5 | 20.5 | 0.79 |
| 3D | 26.0 | 52.7 | 19.7 | 0.75 |
| 4A[a] | 45.3 | 39.3 | 13.5 | 0.30 |
| 4B | 36.5 | 44.5 | 16.8 | 0.46 |
| 4C | 31.0 | 48.6 | 18.9 | 0.61 |
| 4D | 29.6 | 49.0 | 19.9 | 0.67 |
| 5A[a] | 34 | 48.1 | 14.5 | 0.43 |
| 5B | 25.7 | 51.3 | 21.1 | 0.82 |
| 5C | 25.2 | 50.3 | 21.0 | 0.83 |
| 5D | 24.5 | 51.4 | 21.5 | 0.87 | a. Comparative Sample - coating had no post-treatment

As Table 4A illustrates, there was an increase in silicon atom content at the surface when the high power air corona discharge treatment was applied to the coatings. It is believed that this increase was caused by an increase in the colloidal silica particle exposure at the surface of the coatings upon ablation of the polymer binder present at the surface. Example 2, which contained the lowest initial amount of colloidal silica in the coating formulation, had an increase in surface silicon content at each successive corona power increase. Example 5, which contained the highest initial amount of colloidal silica in the coating formulation, reached a maximum silicon surface concentration at the lower air corona discharge power level but had a decrease in carbon atom content after each treatment. The other Examples, which contained initial colloidal silica amounts in their formulations within these two upper and lower limits, had surface silicon atom concentration behaviors that were somewhat between these Examples 2 and 5. Use of the oxygen plasma post-treatment (sample 1E) on the coating described in Example 1 also resulted in an increased silicon content and decreased carbon content of the surface to a level similar to that obtained using the air corona post-treatment.

Figure 3:
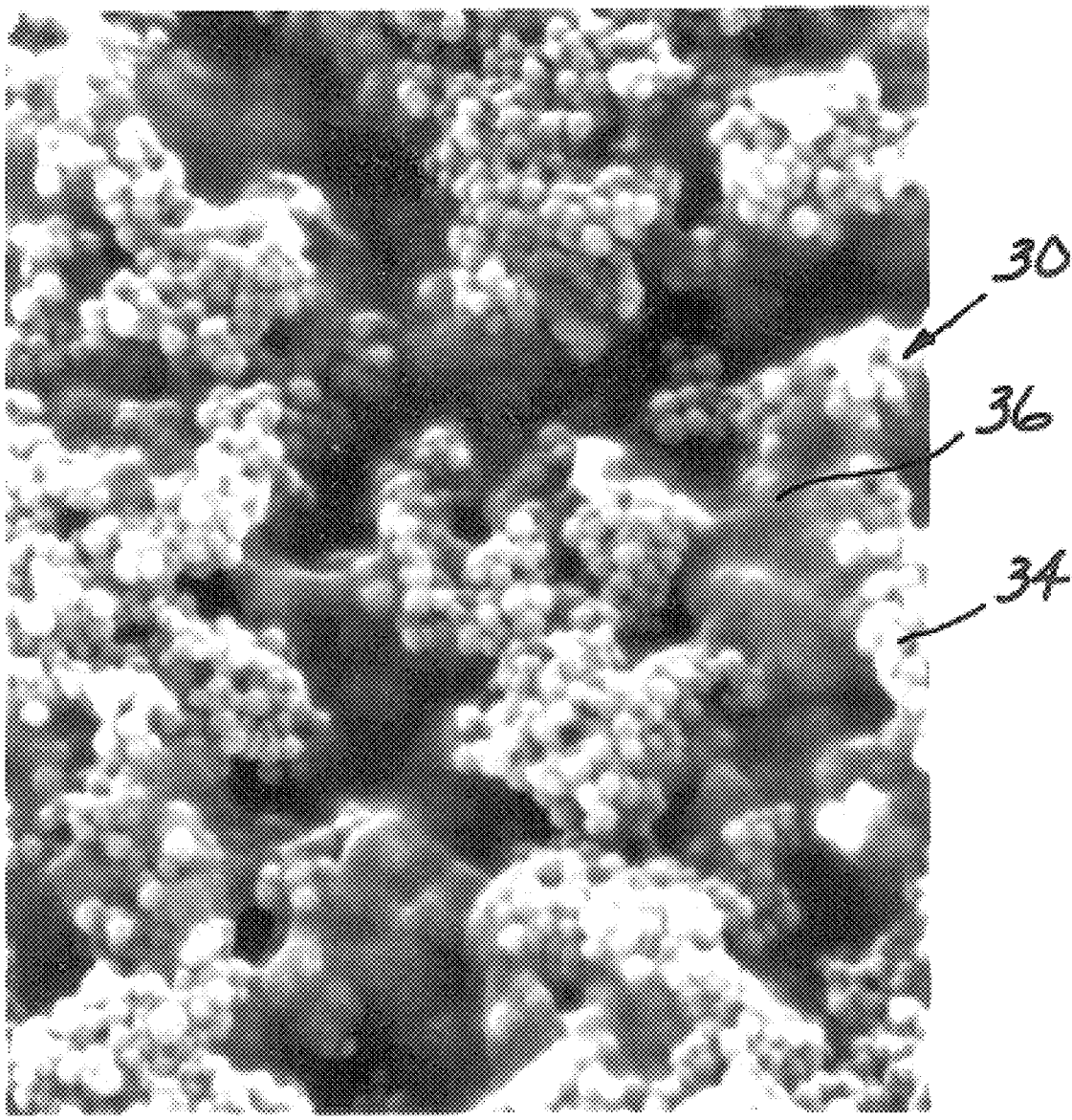
FIG. 3 is a photograph of a comparative hydrophilic polymeric sheet 30 magnified 100,000 times to illustrate metal oxide particles 34 in a polymeric binder 36.
Figure 4:
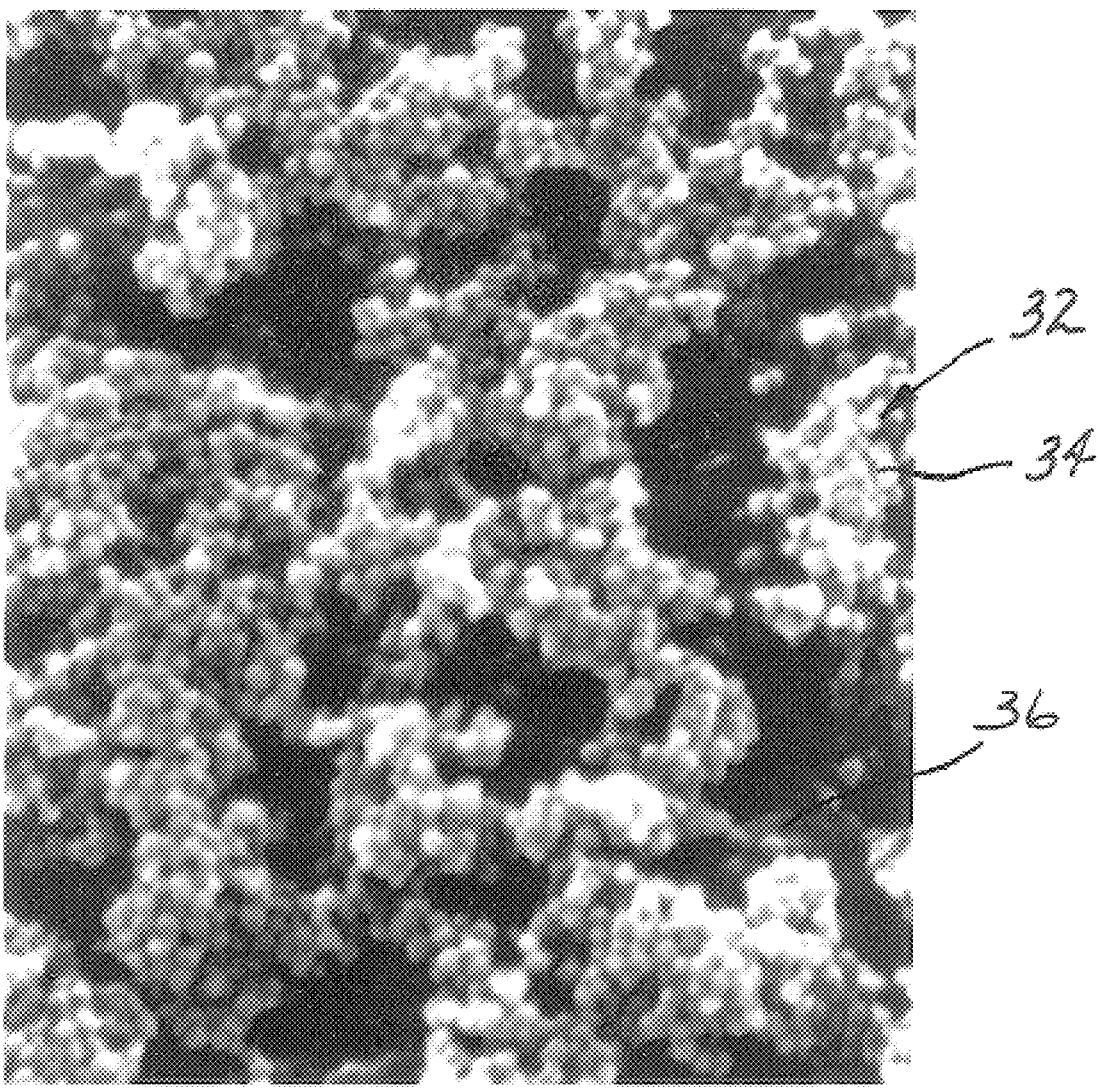
FIG. 4 is a photograph of a hydrophilic polymeric sheet 32 in accordance with the present invention magnified 100,000 times to illustrate metal oxide particles 34 in a polymeric binder 36.

The removal of polymeric binder from the surface of the colloidal metal coatings apparent in the XPS results also was observed with scanning electron microscopy (SEM). FIGS. 3 and 4 are SEM photographic images taken with a Hitachi S-900 Field Emission Scanning Electron Microscope (SEM), of samples 1A 30 and 1D 32. As shown in FIGS. 3 and 4, the air corona treated sample 32 removed polymeric binder 36 to provide increased exposure of the colloidal silica particles 34 at the surface of the sample relative to an untreated sample 30.

Applicants note that other photographs have been taken which do not illustrate this effect to as great an extent or if at all. However, the samples that did not illustrate very clearly the removal of polymeric binder, tended to contain a very high or a very low concentration of metal oxide particles relative to the polymeric binder. From an overall perspective, it is believed that the photographs when viewed in total show that polymeric binder is removed by the surface treatment operation, and thus FIGS. 3 and 4 are presented here merely to illustrate this effect.

The increase in the ratio of metal atoms to carbon atoms after post-treatment with a high power air corona discharge also was apparent with coatings using colloidal metal oxide particles other than silica oxide. Table 4B details the atomic surface concentrations of the coatings of Examples 6 and 7, which used colloidal tin oxide and titanium oxide dispersions in the coatings. Upon post-treatment with a high power air corona discharge at 11.1 joule/cm$^2$, the atomic concentration of the metal present in the colloidal particles of each coating increased at the surface while the carbon content decreased. It is believed that this was caused by an increase in exposure of the colloidal particle at the surface as a result of the removal of the polymer binder.

TABLE 4B

XPS Atomic Concentration Analysis of
Colloidal Tin Oxide and Titanium Oxide
Coatings at Different Air Corona Post-Treatment Levels

| Sample | Air Corona Power (joule/cm$^2$) | Carbon (%) | Oxygen (%) | Sn (%) | Ti (%) | Metal/C Ratio |
|---|---|---|---|---|---|---|
| 6A | 0 | 75 | 22 | 2.2 | — | 0.03 |
| 6B | 11.1 | 63 | 29 | 6.0 | — | 0.10 |
| 7A | 0 | 79 | 20 | — | 0.2 | 0.003 |
| 7B | 11.1 | 72 | 25 | — | 1.1 | 0.02 |

Water Contact Angles

To demonstrate the water-spreading effect of Samples of the invention, the advancing and receding contact angles of water on the surface of the treated and untreated coatings were measured using a contact angle goniometer (Rame-Hart, Inc., Model 100-00-(115)). The advancing contact angle was measured using the advancing contact angle test. In this test, a drop of water was placed on the sample surface and the drop volume was increased by adding water through a syringe until just before the water drop periphery increased on the surface. At the point immediately before the physical movement of the periphery, the advancing contact angle was measured with the goniometer. The receding contact angles were measured by decreasing the volume of the drop by withdrawing water from the drop through a syringe until just before the drop's periphery receded. At the point immediately before the physical movement of the periphery of the drop, the receding contact angle was measured with the goniometer. The test surface was prepared by soaking in water for periods of 0, 1, 4, 8, and 24 hours followed by air drying of the surface. The preferred results are to maintain low advancing contact angles after the initial exposure to water. The advancing contact angle is a very good measurement of the ability of a drop of water to spread out and wet a surface. The advancing contact angle preferably is less than 40 degrees, and more preferably less than 30 degrees, before and after exposure to water soaking. The advancing contact angles for the samples that were post-treated with the air corona discharge at 0, 2.8, 8.3, and 11.1 joule/cm$^2$ or oxygen plasma post-treated are listed in Table 5. The receding contact angles for all of the colloidal silica samples were less than 20 degrees before and after soaking.

TABLE 5

Contact Angle

| | | Advancing Contact Angle After Water Exposure (degrees) | | | | |
|---|---|---|---|---|---|---|
| Example | Sample | 0 hr | 1 hr | 4 hr | 8 hr | 24 hr |
| 1 | 1A[a] | 42 | 66 | 67 | 65 | 68 |
| 1 | 1B | 28 | 42 | 43 | 48 | 48 |
| 1 | 1C | 18 | 28 | 29 | 33 | 35 |
| 1 | 1D | 14 | 20 | 20 | — | 28 |
| 1 | 1E | 8 | 12 | 22 | 21 | 18 |
| 2 | 2A[a] | 62 | 69 | 68 | 67 | 67 |
| 2 | 2B | 39 | 57 | 60 | 55 | 54 |
| 2 | 2C | 37 | 50 | 52 | 51 | 55 |
| 2 | 2D | 33 | 44 | 48 | 47 | 50 |
| 3 | 3A[a] | 48 | 52 | 54 | 55 | 56 |
| 3 | 3B | 16 | 34 | 35 | 33 | 29 |
| 3 | 3C | 12 | 17 | 20 | 23 | 21 |
| 3 | 3D | 12 | 34 | 30 | 30 | 31 |
| 4 | 4A[a] | 49 | 61 | 59 | 58 | 60 |
| 4 | 4B | 11 | 36 | 37 | 36 | 37 |
| 4 | 4C | 10 | 20 | 21 | 19 | 24 |
| 4 | 4D | 12 | 18 | 22 | 22 | 22 |
| 5 | 5A[a] | 28 | 45 | 40 | 44 | 39 |
| 5 | 5B | 14 | 24 | 31 | 33 | 33 |
| 5 | 5C | 13 | 21 | 26 | 26 | 23 |
| 5 | 5D | 12 | 24 | 23 | 22 | 21 |

[a]Comparative Samples — coating had no post-treatment

The post-treatment, whether an oxygen plasma as in sample 1E or an air corona discharge, resulted in significant decreases in the advancing water contact angles of the coatings both before and after exposure to water for times up to 24 hours. The largest decrease in contact angle observed after post-treatment with the high-power air corona discharge was observed for the samples which contained a moderate amount of colloidal silica (Examples 1,3, and 4). The coating containing the largest amount of colloidal silica (Example 5) had advancing contact angles which measured as low or lower than the other samples after air corona post-treatment. The overall change in advancing contact angle of Example 5 was smaller than in Examples 1, 3, and 4 because the advancing contact angle prior to the post-treatment in Example 5 was lower than the advancing contact angles in the other three examples. The samples from these examples which were post-treated with an air corona discharge at 11.1 joule/cm$^2$ had stable advancing contact angles near or below 30° even after exposure to water for 24 hours. Post-treatment at a lower power level (8.3 joule/cm$^2$) resulted in surfaces with stable advancing contact angles after water exposure of less than 30° for coatings from Examples 3, 4, and 5. The coating containing the lowest amount of colloidal silica (Example 2) exhibited a decrease in advancing contact angle after post-treatment with air corona discharge, but did not change in contact angle as drastically as the other coatings. The oxygen plasma post-treated sample 1E exhibited a significant decrease in advancing contact angle, with an advancing contact angle of less than 20° after water exposure up to 24 hours in length. This test shows the ability of the post-treated silica polymeric sheets to have low advancing contact angles that remain low even after extended exposure to water.

Retroreflectivity In Dew Conditions

A simulated dew environment was used to evaluate the retroreflectivity of retroreflective sheetings having hydrophilic sheets made as described above disposed on the front side of the sheetings. The sheeting retroreflectivity measurement was carried out similar to ASTM test E 810-93b, except a dew simulator was used and a calibration technique was employed to account for the presence of a glass window. The dew simulator included an aluminum test deck mounted on a rectangular galvanized steel wall which was inside of an insulated enclosure. The insulated enclosure had a glass window facing the test panel to measure retroreflectivity. The galvanized wall and test deck were cooled to 5° C. to 15° C. with a heat exchanger. Humid air was introduced to the air surrounding the cooled test plate using a humidifier. The retroreflectivity (often expressed as the coefficient of retroreflection, $R_A$) of the reflective sheeting mounted on the test deck was measured through the glass panel as a function of time during the water condensation event (typically 60–80 minutes). The retroreflectivity was measured with a retroreflectometer manufactured by Advanced Retro Technology Inc., La Mesa, Calif. Sample retroreflectivity was measured at an observation angle of 0.2 degrees and an entrance angle of –4 degrees. The measured retroreflectivity was calibrated by a factor of the ratio of the retroreflectivity of the sample measured directly (without a glass window) divided by the retroreflectivity of the reflective sheeting measured through the glass window prior to the introduction of humid air to the chamber. The retroreflectivity was recorded in candelas per lux per square meter.

The test samples were prepared by coating the colloidal metal oxide formulations on an EC-Film as discussed above. The coated EC-Film was adhered to Scotchlite™ High Intensity Sheeting (HIS 3870, 3M Co., St. Paul, Minn.). The HIS 3870 was laminated to a 0.0254 inch thick aluminum test plate. The test plate with the article laminated to the surface was soaked in a deionized water bath for 0.75 to 1.5 hours and dried at 43° C. to 66° C. for about 10 minutes prior to placement in the simulator. The test plate then was placed in the simulator and was attached to the cooled aluminum test deck. The calibrated retroreflectivity of the samples from Examples 1–5 following air corona discharge post-treatments at 0, 2.8, 8.3, and 11.1 joule/cm² are tabulated in Tables 6, 7, 8, 9, and 10, respectively.

It is preferred that the retroreflectivity of the reflective sheeting exhibit a minimum decrease during the water condensation event. It is also desirable to have a fast recovery after the initial loss of retroreflectivity. The initial loss is typical at the start of the condensation event.

TABLE 6

Example 1

Retroreflectivity (candela/lux/m²)

| Sample | 0 min. | 5 | 10 | 15 | 20 |
|---|---|---|---|---|---|
| 1A[a] | 281 | 37 | 25 | 29 | 30 |
| 1B | 291 | 33 | 33 | 53 | 76 |
| 1C | 289 | 64 | 66 | 106 | 127 |
| 1D | 292 | 91 | 125 | 133 | 169 |

Retroreflectivity (candela/lux/m²)

| Sample | 30 | 40 | 50 | 60 | 80 |
|---|---|---|---|---|---|
| 1A[a] | 54 | 52 | 73 | 97 | 111 |
| 1B | 116 | 138 | 146 | 161 | 174 |
| 1C | 173 | 170 | 157 | 172 | 186 |
| 1D | 200 | 202 | 210 | 207 | 221 |

[a]Comparative Sample — coating had no post-treatment.

TABLE 7

Example 2

Retroreflectivity (candela/lux/m²)

| Sample | 0 min. | 5 | 10 | 15 | 20 | 25 | 30 | 40 | 50 | 60 |
|---|---|---|---|---|---|---|---|---|---|---|
| 2A[a] | 271 | 102 | 49 | 35 | 32 | 31 | 28 | 29 | 31 | 31 |
| 2B | 289 | 89 | 41 | 35 | 28 | 27 | 28 | 33 | 41 | 47 |
| 2C | 293 | 63 | 32 | 28 | 26 | 28 | 32 | 40 | 58 | 66 |
| 2D | 286 | 41 | 27 | 29 | 32 | 38 | 52 | 75 | 89 | 108 |
| HIS 3870[b] | 309 | 114 | 66 | 61 | 61 | 63 | 68 | 76 | 72 | 77 |

[a]Comparative Sample — coating had no post-treatment
[b]3M Scotchlite ™ High Intensity Sheeting without coating or post-treatment

TABLE 8

Example 3

Retroreflectivity (candela/lux/m²)

| Sample | 0 min. | 5 | 10 | 15 | 20 |
|---|---|---|---|---|---|
| 3A[a] | 284 | 39 | 31 | 35 | 47 |
| 3B | 301 | 49 | 91 | 149 | 199 |
| 3C | 295 | 134 | 211 | 208 | 233 |
| 3D | 292 | 148 | 218 | 225 | 251 |
| HIS 3870[b] | 308 | 116 | 85 | 76 | 79 |

Retroreflectivity (candela/lux/m²)

| Sample | 30 | 40 | 50 | 70 | 80 |
|---|---|---|---|---|---|
| 3A[a] | 129 | 113 | 152 | 171 | 203 |
| 3B | 245 | 246 | 262 | 250 | 258 |
| 3C | 253 | 256 | 254 | 238 | 242 |
| 3D | 273 | 267 | 256 | 239 | 248 |
| HIS 3870[b] | 82 | 84 | 84 | 82 | 89 |

[a]Comparative Sample — coating had no post-treatment
[b]3M Scotchlite ™ High Intensity Sheeting without coating or post-treatment

TABLE 9

Example 4

Retroreflectivity (candela/lux/m²)

| Sample | 0 min. | 5 | 10 | 15 | 20 |
|---|---|---|---|---|---|
| 4A[a] | 287 | 95 | 31 | 27 | 27 |
| 4B | 286 | 111 | 71 | 97 | 126 |
| 4C | 283 | 132 | 94 | 140 | 173 |
| 4D | 290 | 108 | 154 | 190 | 206 |

Retroreflectivity (candela/lux/m²)

| Sample | 30 | 40 | 50 | 60 | 80 |
|---|---|---|---|---|---|
| 4A[a] | 37 | 56 | 76 | 105 | 129 |
| 4B | 166 | 188 | 209 | 210 | 206 |
| 4C | 193 | 209 | 240 | 225 | 218 |
| 4D | 220 | 236 | 243 | 236 | 231 |

[a]Comparative Sample — coating had no post-treatment

TABLE 10

Example 5

Retroreflectivity (candela/lux/m²)

| Sample | 0 min. | 5 | 10 | 15 | 20 | 30 | 40 | 50 | 60 | 80 |
|---|---|---|---|---|---|---|---|---|---|---|
| 5A[a] | 296 | 60 | 29 | 33 | 46 | 71 | 85 | 102 | 110 | 133 |
| 5B | 304 | 41 | 81 | 122 | 153 | 172 | 176 | 183 | 192 | 191 |
| 5C | 303 | 47 | 63 | 100 | 140 | 167 | 174 | 184 | 195 | 190 |
| 5D | 301 | 44 | 73 | 108 | 139 | 168 | 176 | 173 | 181 | 192 |

[a]Comparative Sample — coating had no post-treatment

The air corona post-treatment of the colloidal silica coatings resulted in a significant improvement in the recovery of retroreflectivity of the reflective sheeting to which the coatings were applied in the simulated dew environment. In the case of the coating containing the lowest initial concentration of colloidal silica (Example 2) used in the coating formulation, the improvement, which is defined in terms of degree and speed of the recovery of retroreflectivity during the water condensation event, was gradual and increased with increased air corona discharge power level. Samples from Examples 1, 3, 4, and 5, which contained higher concentrations of colloidal silica in their coating formulations, exhibited faster and greater improvements of retroreflectivity recovery in dew conditions at similar air corona post-treatment power levels. It should be noted that in the absence of any post-treatment, the recovery of retroreflectivity of the reflective sheeting was not as good.

The effect of the air corona discharge post-treatment was to remove the hydrophobic polymer resin at the surface and increase the exposure of the hydrophilic colloidal silica particles at the surface. This process decreased the advancing contact angle and increased the hydrophilicity of the sample. This allowed water drops formed in the dew process to spread and wet out the surface. This in turn allowed the retroreflectivity to recover quickly as compared to the non-treated film because the formation of the small water drops disrupted the path of light entering and reflecting from the sheeting and lowered the retroreflectivity of the sheeting.

This invention may take on various modifications and alterations without departing from the spirit and scope thereof. Accordingly, it is to be understood that this invention is not to be limited to the above-described, but is to be controlled by the limitations set forth in the following claims and any equivalents thereof.

What is claimed is:

1. A hydrophilic polymeric article that comprises:
a polymeric sheet that is about 5 micrometers or more thick and that has 5 to 90 weight percent of metal oxide particles dispersed in a polymeric material, the polymeric sheet having a first major surface and an interior, there being a higher ratio of metal to carbon atoms on the first major surface of the polymeric sheet relative to the interior thereof.

2. The hydrophilic polymeric article of claim 1, wherein the metal oxide contains Group 2–14 metal.

3. The hydrophilic polymeric article of claim 2, wherein the metal of the metal oxide particles is selected from the group consisting of aluminum, silicon, tin, zinc, titanium, vanadium, zirconium, chromium, and combinations thereof.

4. The hydrophilic polymeric article of claim 3, wherein the metal oxide particles are silicon dioxide, aluminum oxide, or a combination thereof.

5. The hydrophilic polymeric article of claim 4, wherein the metal oxide particles have sizes ranging from 0.001 to 100 micrometers.

6. The hydrophilic polymeric article of claim 5, wherein the metal oxide particles have sizes ranging from 0.002 to 10 micrometers.

7. The hydrophilic polymeric article of claim 1, wherein the metal oxide particles have sizes ranging from 0.005 to 0.08 micrometers.

8. The hydrophilic polymeric article of claim 1, wherein the metal oxide particles are uniformly dispersed throughout the polymeric sheet at 5 to 90 weight percent, based on the weight of the polymeric sheet.

9. The article of claim 8, wherein the metal oxide particles are dispersed throughout the polymeric sheet at 30 to 85 weight percent.

10. The hydrophilic polymeric article of claim 1, wherein the polymeric material is selected from the polymers consisting of an aliphatic polyurethane, a polyvinyl chloride copolymer having a minor portion of a comonomer containing a carboxylic acid or a hydroxyl moiety, an acrylic polymer having a glass transition temperature of −20° C. to 60° C., and combinations thereof.

11. The hydrophilic polymeric article of claim 1, wherein the article is transparent.

12. The hydrophilic polymeric article of claim 11, wherein the polymeric sheet contains 5 to 85 weight percent of polymeric material, and wherein the metal oxide particles include silica or aluminum oxide particles having sizes of 0.005 to 0.08 micrometers.

13. The hydrophilic polymeric article of claim 12, wherein the polymeric sheet contains 20 to 40 weight percent of polymeric material, and 40 to 80 weight percent of metal oxide particles.

14. The hydrophilic polymeric article of claim 11, having a thickness of 0.1 to 100 micrometers.

15. The hydrophilic polymeric article of claim 14, wherein the polymeric sheet has a thickness of 0.3 to 5 micrometers.

16. The hydrophilic polymeric article of claim 11, wherein the first major surface has a metal to carbon atom ratio of at least 0.01.

17. The hydrophilic polymeric article of claim 16, wherein there is at least a 20 percent higher ratio of metal to carbon atoms at the first major surface relative to the interior.

18. The hydrophilic polymeric article of claim 17, wherein the metal to carbon atom ratio is 0.3 to 3.

19. The hydrophilic polymeric article of claim 18, wherein the metal to carbon atom ratio is 0.4 to 1.5.

20. The hydrophilic polymeric article of claim 1, having at least a 30 percent higher ratio of metal to carbon atoms on the first major surface relative to the interior.

21. The hydrophilic polymeric article of claim 20, wherein there is at least a 45 percent higher ratio of metal to carbon atoms on the first major surface relative to the interior.

22. The hydrophilic polymeric article of claim 21, further comprising a transparent plastic layer, an adhesive, and a release liner, the transparent plastic layer having first and second major surfaces, the first major surface of the transparent plastic layer being secured to a second major surface of the polymeric sheet, the adhesive being disposed on the second major surface of the transparent plastic layer, and the release liner being disposed over the adhesive.

23. The article of claim 22, wherein the transparent plastic layer comprises an acrylic polymer having a thickness of 10 to 250 micrometers, and wherein the adhesive is a pressure-sensitive adhesive.

24. The article of claim 1, wherein:
(i) the polymeric sheet is transparent;
(ii) the metal oxide contains a Group 2–14 metal;
(iii) the metal oxide particles have sizes ranging from 0.005 to 0.08 micrometers;
(iv) the metal oxide particles are uniformly dispersed throughout the polymeric sheet at 40 to 80 weight percent, based on the weight of the polymeric sheet;
(v) the polymeric material is selected from the polymers consisting of an aliphatic polyurethane, a polyvinyl chloride copolymer having a minor portion of a comonomer containing a carboxylic acid or a hydroxyl moiety, an acrylic polymer having a glass transition temperature of −20° C. to 60° C. and combinations thereof;
(vi) the polymeric sheet has a thickness of 0.1 to 100 micrometers;
(vii) the first major surface has a metal to carbon atom ratio of at least 0.01;
(viii) there is at least a 30 percent higher ratio of metal to carbon atoms at the first major surface relative to the interior; and
(ix) the first major surface exhibits an advancing contact angle less than 40° after being soaked in water for one hour and tested in accordance with an advancing contact angle test.

25. A retroreflective article, which comprises:
(a) a retroreflective sheeting having first and second major surfaces; and
(b) a transparent water-spreading layer disposed on the first major surface of the retroreflective sheeting, the water-spreading layer comprising a polymeric material that has metal oxide particles dispersed therein, the water-spreading layer having first and second major surfaces and an interior, the second major surface of the water-spreading layer being juxtaposed against the first major surface of the retroreflective sheeting, and the first major surface of the water-spreading layer having a higher ratio of metal to carbon atoms relative to the interior of the water-spreading layer.

26. The retroreflective article of claim 25, wherein the metal oxide particles are silicon dioxide, aluminum oxide, or a combination thereof, and wherein the metal oxide particles have sizes ranging from 0.001 to 100 micrometers, and further wherein the metal oxide particles are uniformly dispersed throughout the water-spreading layer.

27. The retroreflective article of claim 26, wherein the polymeric material elected from polymers consisting of an aliphatic urethane, a polyvinyl chloride copolymer having a minor portion of a comonomer containing a carboxylic acid or a hydroxyl moiety, an acrylic polymer having a glass transition temperature of −20° C. to 60° C., and combinations thereof.

28. A hydrophilic polymeric article that comprises:
a polymeric sheet that has 5 to 90 weight percent of metal oxide particles dispersed in a polymeric material, the polymeric sheet having a first major surface and an interior, there being a higher ratio of metal to carbon atoms on the first major surface of the polymeric sheet relative to the interior thereof.

29. The hydrophilic polymeric article of claim 28, wherein the polymeric sheet has a thickness of 0.1 to 100 micrometers.

30. The hydrophilic polymeric article of claim 28, wherein the polymeric sheet has a thickness of 0.2 to 15 micrometers.

31. The hydrophilic polymeric article of claim 28, wherein the metal oxide particles are silicon dioxide, aluminum oxide, or a combination thereof, and wherein the metal oxide particles have sizes ranging from 0.001 to 100 micrometers, and further wherein the metal oxide particles are uniformly dispersed throughout the polymeric sheet.

32. The hydrophilic polymeric article of claim 28, wherein the metal oxide contains Group 2–14 metal.

33. The hydrophilic polymeric article of claim 32, wherein the metal of the metal oxide particles is selected from the group consisting of aluminum, silicon, tin, zinc, titanium, vanadium, zirconium, chromium, and combinations thereof.

34. The hydrophilic polymeric article of claim 33, wherein the metal oxide particles are silicon dioxide, aluminum oxide, or a combination thereof.

35. The hydrophilic polymeric article of claim 34, wherein the metal oxide particles have sizes ranging from 0.001 to 100 micrometers.

36. The hydrophilic polymeric article of claim 35, wherein the metal oxide particles have sizes ranging from 0.002 to 10 micrometers.

37. The hydrophilic polymeric article of claim 28, wherein the metal oxide particles have sizes ranging from 0.005 to 0.08 micrometers.

38. The hydrophilic polymeric article of claim 28, wherein the metal oxide particles are uniformly dispersed throughout the polymeric sheet at 5 to 90 weight percent, based on the weight of the polymeric sheet.

39. The hydrophilic polymeric article of claim 38, wherein the metal oxide particles are dispersed throughout the polymeric sheet at 30 to 85 weight percent.

40. The hydrophilic polymeric article of claim 28, wherein the polymeric material is selected from the polymers consisting of an aliphatic polyurethane, a polyvinyl chloride copolymer having a minor portion of a comonomer containing a carboxylic acid or a hydroxyl moiety, an acrylic polymer having a glass transition temperature of −20° C. to 60° C., and combinations thereof.

41. The hydrophilic polymeric article of claim 28, wherein the article is transparent.

42. The hydrophilic polymeric article of claim 41, wherein the polymeric sheet contains 5 to 85 weight percent of polymeric material, and wherein the metal oxide particles include silica or aluminum oxide particles having sizes of 0.005 to 0.08 micrometers.

43. The hydrophilic polymeric article of claim 42, wherein the polymeric sheet contains 20 to 40 weight percent of polymeric material, and 40 to 80 weight percent of metal oxide particles.

44. A retroreflective article that has the hydrophilic polymeric article of claim 41 disposed thereon.

45. The hydrophilic polymeric article of claim 28, wherein the first major surface has a metal to carbon atom ratio of at least 0.01.

46. The hydrophilic polymeric article of claim 45, wherein there is at least a 20 percent higher ratio of metal to carbon atoms at the first major surface relative to the interior.

47. The hydrophilic polymeric article of claim 46, wherein the metal to carbon atom ratio is 0.3 to 3.

48. The hydrophilic polymeric article of claim 47, wherein the metal to carbon atom ratio is 0.4 to 1.5.

49. The hydrophilic polymeric article of claim 28, having at least a 30 percent higher ratio of metal to carbon atoms on the first major surface relative to the interior.

50. The hydrophilic polymeric article of claim 49, wherein there is at least a 45 percent higher ratio of metal to carbon atoms on the first major surface relative to the interior.

51. The hydrophilic polymeric article of claim 50, further comprising a transparent plastic layer, an adhesive, and a release liner, the transparent plastic layer having first and second major surfaces, the first major surface of the transparent plastic layer being secured to a second major surface of the polymeric sheet, the adhesive being disposed on the second major surface of the transparent plastic layer, and the release liner being disposed over the adhesive.

52. The hydrophilic: polymeric article of claim 51, wherein the transparent plastic layer comprises an acrylic polymer having a thickness of 10 to 250 micrometers, and wherein the adhesive is a pressure-sensitive adhesive.

* * * * *

UNITED STATES PATENT AND TRADEMARK OFFICE
CERTIFICATE OF CORRECTION

PATENT NO.   : 5,939,182
DATED         : August 17, 1999
INVENTOR(S)  : Tzu-Li J. Huang and David A. Kaisaki It is certified that error appears in the above-identified patent and that said Letters Patent is hereby corrected as shown below:

Column 6,
Line 13, "NeoRez∩" should read -- NeoRez$^{TM}$ --.

Column 24,
Line 48, "claim 28" should read -- claim 38 --.

Signed and Sealed this

Eleventh Day of December, 2001

*Attest:*

*Attesting Officer*

NICHOLAS P. GODICI
*Acting Director of the United States Patent and Trademark Office*